(No Model.)
N. C. MITCHELL.
ART OF BEE KEEPING.
No. 314,973. Patented Mar. 31, 1885.
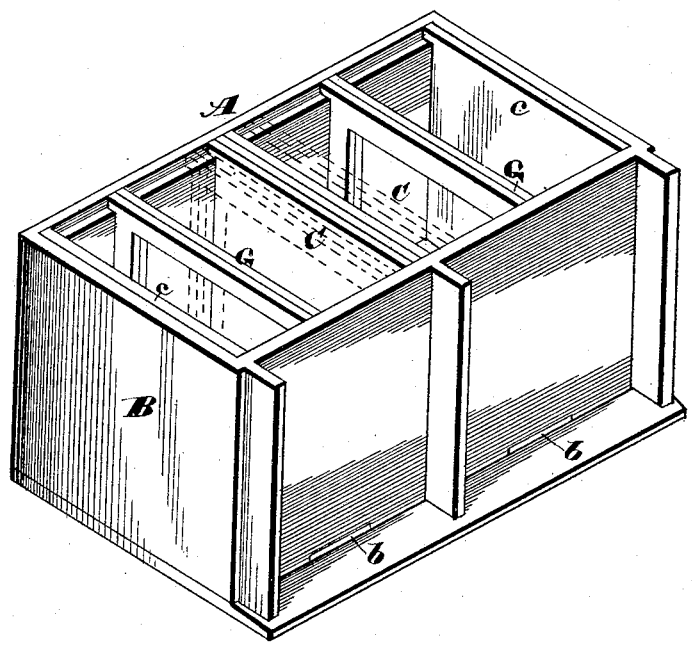
WITNESSES
INVENTOR

UNITED STATES PATENT OFFICE.

NELSON C. MITCHELL, OF KANSAS CITY, MISSOURI.

ART OF BEE-KEEPING.

SPECIFICATION forming part of Letters Patent No. 314,973, dated March 31, 1885.

Application filed January 21, 1885. (No model.)

*To all whom it may concern:*

Be it known that I, NELSON C. MITCHELL, a citizen of the United States, residing at Kansas City, State of Missouri, have invented certain new and useful Improvements in the Art of Bee-Keeping, of which the following is a specification.

My invention relates to the prevention of swarming and the multiplying of colonies of bees; and it consists in a process by which these ends may be accomplished without interruption of the normal work of the bees.

In the method at present employed for what is known as "artificial swarming," in distinction from natural swarming, it is customary to divide the brood and store parts of the colony and place one division in an entirely separate hive; but in that case the worker bees, having become accustomed to going in and out of the original hive and knowing its location, will not remain and work in the new hive, so that the brood in the new hive will suffer from want of food and care, and but little honey will be produced before the young bees have grown to working age and size, which consumes nearly the entire working season of one year. It is also customary to provide a sectional hive for a single colony, and when the colony becomes too large remove one or more sections containing a part of the colony and replace them with empty sections, such method being shown in Patents Nos. 127,281, 73,915, 62,043, and others. In my process, however, I place an original colony in the middle of a compartment that is of a size sufficient to ultimately accommodate two colonies, and which is provided with two entrances painted different colors on the outside, but both giving access to the original colony. When, now, by natural increase the colony becomes of a size to warrant or demand a division, I take a part of the brood and store frames of the colony, and place them in one half of the original compartment with a new queen, and remove the remaining part to the opposite half with the original queen. I then insert between the two colonies thus formed removable partitions, so as to have two distinct colonies, one in each half of the original compartment, and each having one of the two entrances that were before common to the original colony. The original colony is now subdivided, as in the usual method of artificial swarming; but there is this important difference that the worker bees will not thereafter desert either one of the subdivisions; but having become accustomed to working in and out of the two differently-colored entrances indifferently, they will continue to do so and will support both of the colonies in the normal manner, so that there will be no interruption in work of producing honey, and both colonies will be kept up to the same normal strength. This is not the case where the bees are allowed to swarm voluntarily or are artificially divided by the usual methods, and as the necessity for division comes at the height of the working season the interruption caused by division or swarming results in a serious loss.

Young bees hatched subsequently to the division will naturally become accustomed to their own distinctively-colored home and will not leave it for any other, so that neither colony will draw young bees away from the other, as would be the case were the two entrances of the same color.

In my application No. 123,616, filed March 10, 1884, of which this is a division, I have shown and described in full the beeway that I use in carrying out my process, and I do not herein lay claim to this beeway or to any of the apparatus; but for the purpose of illustrating the application of my process I have shown in the accompanying drawing a perspective view of a part of the said beeway.

In the drawing, A indicates an original compartment of a beeway, B, which has been subdivided by movable partitions C C. *b b* represent the two entrances, and G G the removable brood and honey frames in each subdivision.

Supposing, now, that the compartment A is entirely vacant, I place my original brood and comb frames therein at a point midway between the two entrances *b b*, so as to be accessible from both. The two movable partitions *c c* are brought up near the frames without, however, closing either of the openings *b b*. The position of the original colony is indicated by the dotted lines. The colony being placed in position, the bees will carry on their work, the workers going in and out of the two entrances *b b* indifferently, though the porticoes are painted different colors, since they become accustomed from their early youth to regard both entrances as their home. When, now, the colony has reached a size where subdivision is necessary, I separate the frames containing the colony into two parts, giving each part a share of the brood and comb frames in the usual manner, and giving one part a new queen, while allowing the old queen to remain with the other part. I place these two parts in the two halves of the original compartment, respectively, as shown at G, and insert partitions C C between them, so that the compartment is subdivided into two separate hives, each having an entrance, *b*. Each one of the two colonies thus formed will be supplied with worker bees as well as with young bees and brood, for the old workers having become accustomed to working indifferently in either entrance will continue to do so and will keep up the production of honey and maintain the brood uninterruptedly, whereas by previous methods of artificial swarming the old bees can not be persuaded to leave their original quarters and work for the support of the new colony. The work of the bees will hence by my method go on without interruption during the entire working season in the original and the divided state, and a large increase in the strength of the colonies and in the amount of honey produced will result.

It is possible to treat each colony after division as an original colony for further subdivision; but in practice a single division annually only is advisable.

I am aware that a subdivision of an original colony has been placed in an adjacent independent compartment, an arrangement of that kind being described in volume 12, page 185, of the American Bee Journal; but never before has the original compartment been provided with two differently colored entrances and then subdivided in the manner above described, so that after subdivision the old worker bees will labor for both colonies indifferently.

What I claim as my invention is—

The herein-described improvement in the art of bee-keeping, which consists of the following steps: first, in placing an original colony in an extensible compartment having two differently-marked entrances and of a size sufficient to accommodate two colonies, whereby the worker bees are taught to recognize either of said entrances as leading to their home; second, in subdividing the colony without changing its location at the proper point of increase thereof in the original compartment; and, third, in extending the compartment laterally to accommodate the subdivided colony, whereby swarming is prevented and the workers will remain with and labor for either or both colonies, and the young bees hatched after the division will recognize but one of the distinctively-marked entrances as leading to their home, substantially as described.

Signed this 16th day of December, 1884, in the presence of two attesting witnesses.

NELSON C. MITCHELL.

Witnesses:
C. E. KELLY,
C. W. DANCE.